US010946449B2

(12) United States Patent
Gerking et al.

(10) Patent No.: US 10,946,449 B2
(45) Date of Patent: Mar. 16, 2021

(54) DEVICE AND METHOD FOR MELTING A MATERIAL WITHOUT A CRUCIBLE AND FOR ATOMIZING THE MELTED MATERIAL IN ORDER TO PRODUCE POWDER (71) Applicant: NANOVAL GmbH & Co. KG, Berlin (DE)

(72) Inventors: Lüder Gerking, Berlin (DE); Christian Gerking, Forst (DE); Martin Stobik, Berlin (DE); Rico Heinz, Liebenwalde (DE)

(73) Assignee: NANOVAL GmbH & Co. KG, Berlin (DE)

( * ) Notice: Subject to any disclaimer, the term of this patent is extended or adjusted under 35 U.S.C. 154(b) by 300 days.

(21) Appl. No.: 15/104,143

(22) PCT Filed: Dec. 19, 2014

(86) PCT No.: PCT/EP2014/078849
§ 371 (c)(1),
(2) Date: Jun. 13, 2016

(87) PCT Pub. No.: WO2015/092008
PCT Pub. Date: Jun. 25, 2015

(65) Prior Publication Data
US 2016/0318105 A1 Nov. 3, 2016

(30) Foreign Application Priority Data
Dec. 20, 2013 (DE) ...................... 10 2013 022 096.3

(51) Int. Cl.
B22F 9/08 (2006.01)
B22F 1/00 (2006.01)
(Continued)

(52) U.S. Cl.
CPC ............ *B22F 9/082* (2013.01); *B22F 1/0014* (2013.01); *C04B 35/626* (2013.01); *H05B 6/101* (2013.01);
(Continued)

(58) Field of Classification Search
CPC ....................................................... B22F 9/082
See application file for complete search history.

(56) References Cited

U.S. PATENT DOCUMENTS 2,864,137 A    12/1958  Brennan
4,631,384 A *  12/1986  Cornu ..................... F23G 5/085
                                                    204/157.4
(Continued)

FOREIGN PATENT DOCUMENTS

DE    1958610 A1    6/1970
DE    3311343 A1    10/1984
(Continued)

OTHER PUBLICATIONS

European Patent Office machine translation of DE 10340606 (Year: 2003).*
(Continued)

Primary Examiner — Anthony J Zimmer
Assistant Examiner — Michael J Kachmarik
(74) Attorney, Agent, or Firm — Schwegman Lundberg & Woessner, P.A.

(57) ABSTRACT

The present disclosure relates to a device for melting a material without a crucible and for atomizing the melted material in order to produce powder, comprising: an atomizing nozzle; an induction coil having windings, which become narrower in the direction of the atomizing nozzle at least in some sections; and a material bar at least partially inserted into the induction coil. The induction coil is designed to melt the material of the material bar in order to (Continued)

produce a melt flow. The induction coil and the atomizing nozzle are arranged in such a way that the melt flow is or can be introduced into the atomizing nozzle through a first opening of the atomizing nozzle in order to atomize the melt flow by means of an atomizing gas, which can be introduced into the atomizing nozzle.

14 Claims, 9 Drawing Sheets

(51) Int. Cl.
  *C04B 35/626* (2006.01)
  *H05B 6/10* (2006.01)
(52) U.S. Cl.
  CPC .......... *B22F 2009/0824* (2013.01); *B22F 2009/0836* (2013.01); *B22F 2009/0848* (2013.01); *B22F 2009/0892* (2013.01); *B22F 2009/0896* (2013.01); *B22F 2202/07* (2013.01); *B22F 2304/10* (2013.01); *B22F 2998/10* (2013.01); *B22F 2999/00* (2013.01); *C04B 2235/786* (2013.01)

(56) References Cited

U.S. PATENT DOCUMENTS

| | | | | |
|---|---|---|---|---|
| 4,762,553 A | * | 8/1988 | Savage | B22F 9/08 219/648 |
| 4,822,267 A | * | 4/1989 | Walz | B22F 9/082 264/12 |
| 4,919,854 A | | 4/1990 | Walz | |
| 5,004,153 A | * | 4/1991 | Sawyer | B22D 23/003 164/46 |
| 5,022,455 A | | 6/1991 | Takeda et al. | |
| 5,284,329 A | * | 2/1994 | Hohman | B22F 9/082 266/202 |
| 5,609,922 A | | 3/1997 | Mcdonald | |
| 5,792,258 A | * | 8/1998 | Kimura | C30B 13/20 117/222 |
| 6,481,638 B1 | * | 11/2002 | Schulz | B29B 9/10 239/8 |
| 2008/0093045 A1 | * | 4/2008 | Rimmer | B22D 23/003 164/46 |

FOREIGN PATENT DOCUMENTS

| | | | | |
|---|---|---|---|---|
| DE | 4102101 A1 | 7/1992 | | |
| DE | 19631582 A1 | 2/1998 | | |
| DE | 10340606 A1 | * | 3/2005 | B01J 2/04 |
| EP | 0220418 A1 | 5/1987 | | |
| EP | 0444767 A2 | 9/1991 | | |
| EP | 1434935 A1 | 7/2004 | | |
| EP | 1765536 B1 | 3/2009 | | |
| EP | 3083107 A1 | 10/2016 | | |
| JP | 2007291454 A | 11/2007 | | |
| KR | 910000128 B1 | 1/1991 | | |
| WO | WO-2005123305 A2 | 12/2005 | | |
| WO | WO-2005123311 A1 | 12/2005 | | |
| WO | WO-2015092008 A1 | 6/2015 | | |

OTHER PUBLICATIONS

"Chinese Application No. 201480069622.8, Office Action dated May 31, 2017", w/ English Translation, (dated May 31, 2017), 16 pgs.
"Chinese Application No. 201480069622.8, Office Action dated Jan. 19, 2018", w/ English Translation, (dated Jan. 19, 2018), 20 pgs.
"Singapore Application No. 11201604837Y, Written Opinion dated Jun. 29, 2017", (dated Jun. 29, 2017), 8 pgs.
"International Application Serial No. PCT/EP2014/078849, International Search Report dated May 8, 2015", w/ English Translation, 7 pgs.
"International Application Serial No. PCT/EP2014/078849, Written Opinion dated May 8, 2015", w/ English Translation, 14 pgs.
"Chinese Application No. 201480069622.8 dated Sep. 28, 2018",w/ English Translation, 8 pgs.
"European Application No. 14821630.2 Search Report dated Oct. 24, 2018", w/English Translation, 4 pgs.
"Singapore Application No. 11201604837Y Written Opinion dated May 2, 2018", w/English Translation, 6 pgs.
"Singapore Application No. 11201604837Y Written Opinion dated Jun. 18, 2017", w/English Translation, 27 pgs.
"Canadian Application Serial No. 2,934,433 Office Action dated Apr. 28, 2020", (dated Apr. 28, 2020), 4 pgs.
"Indian Application Serial No. 201617023053, Office Action dated Sep. 9, 2020", (dated Sep. 9, 2020), 6 pgs.
"Korean Application Serial No. 10-2016-7018159, Office Action dated Jun. 16, 2020", w/ English Translation, (dated Jun. 16, 2020), 13 pgs.
Bojarevics, V., et al., "Numerical model of electrode induction melting for gas atomization", International Symposium on Heating by Electromagnetic Sources, (2010), 8 pgs.
Franz, Henrik, et al., "Recent advances of titanium alloy powder production by ceramic-free inert gas atomization", Proc. Titanium, (2008), 14 pg.
Gerking, L, et al., "Powder from Metal and Ceramic Melts by Laminar Gas Steams at Supersonic Speeds", Thermal Spraying Conference PMI vol. 25 No. 2, (1993), 8 pgs.
Ouyang, Hong-Wu, et al., "Influence of melt superheat on breakup process of close-coupled gas atomization", Transactions of Nonferrous Metals Society of China 17.5, (2007), 967-973.
Stobik, M., "Nanoval atomizing-superior flow design for fine powder", Proceedings of the International Conference on Spray Deposition and Melt Atomization, Bremen, Germany, (2000), 512-520.
Von Pulmern, Herstellung, "Chapter 2.2", Mechanische Zerkeinerung mit Phasenumwandlung, pp. 16-17.
Zheng, Baolong, et al., "Gas atomization of amorphous aluminum: Part I. Thermal behavior calculations", Metallurgical and Materials Transactions B 40.5, (2009), 768-778.

\* cited by examiner

DEVICE AND METHOD FOR MELTING A MATERIAL WITHOUT A CRUCIBLE AND FOR ATOMIZING THE MELTED MATERIAL IN ORDER TO PRODUCE POWDER

PRIORITY APPLICATIONS

This application is a U.S. National Stage Filing under 35 U.S.C. 371 from International Application No. PCT/EP2014/078849, filed on 19 Dec. 2014, and published as WO 2015/092008 on 25 Jun. 2015, which claims the benefit of priority to German Application No. 1020130220963, filed on Dec. 20, 2013; which applications and publication are incorporated herein by reference in their entirety.

The invention relates to a method and to a device for the crucible-free melting of a material and for atomising the melted material, for manufacturing power, in particular for manufacturing metal or ceramic powder.

Metal powder is applied in many fields of technology. Metal powder is produced with the powder injection moulding method (PIM) or also with generative methods, also called additive methods, such as laser sintering/melting and electron beam melting, and can often be melted into complex three-dimensional structures. Metal powders with grain sizes in the micrometer region are often required. Thereby, for many applications, it is extremely important that the grain size of the metal powder does not exceed a maximal grain size and that a fluctuation width of a statistical grain size distribution of the manufactured powder is as small as possible, thus that the grain size deviates as little as possible from a desired grain size.

From the patent document DE10340606B4, it is known to melt metal in a crucible and to atomise it into metal powder by way of a Laval nozzle. Thereby, it is extremely important to thermally shield the melt nipple, with which the metal melted in the crucible is introduced into the nozzle, with respect to the cold atomisation gas, since the melt otherwise cools to greatly, which significantly worsens the quality of the produced powder (grains shape, grain size, grain size distribution width) or renders the atomisation impossible. A suitable shielding has therefore been suggested in DE10340606B4. One challenge was to design the shielding in a manner that it does not disadvantageously influence the flow profile of the atomisation gas before entry into the nozzle, since this flow profile also has a considerable influence on the quality of the produced powder.

A disadvantage of the device described in DE10340606B4 lies in the fact that no materials which chemically react with the crucible coating and become impure on account of this reaction can be melted and pulverised in the crucible. This problem occurs for example with the crucible melting of titanium. A device for the crucible-free melting of metal has therefore already been suggested in DE4102101A1. Thereby, a metal rod is melted by way of an induction coil and subsequently likewise atomised by way of an atomisation nozzle. However, the problem of the melt flow which is produced on melting the rod being greatly cooled by the atomisation gas occurs to an even more significant extent with the device according to DE4102101A1 than with the device according to DE10340606B4.

A completely different type of atomisation is suggested with the device according to DE4102101A1, in order to circumvent this problem. According to this, the nozzle comprises a first opening, through which the melt flow is introduced into the nozzle. The atomisation gas again is led into the nozzle through a lateral opening of the nozzle which is different to the first opening, thus in a direction perpendicular to the flow direction of the melt flow through the nozzle. The atomisation gas in the nozzle hits the melt flow perpendicularly with a great impulse and breaks up the melt flow, so that drops are formed, which subsequently freeze into powder. Essentially the same type of atomisation is also described in EP1765536B1. The cooling of the melt flow before entering into the nozzle is at least partly prevented by way of the lateral introduction of the atomisation gas into the nozzle.

However, it has been found that only powder of a comparatively large grain size distribution width can be manufactured with the type of atomisation which has been put forward in DE4102101A1 and EP1765536B1. A desired grain size thus under certain circumstances can only be set to an inadequate precision, so that much wastage occurs as the case may be. The manufacturing costs can increase due to this.

It is therefore the object of the present invention, to create a device and a method, with which an as large as possible multitude of materials can be pulverised, wherein a grain size and the grain size distribution of the manufactured powder can be set as precisely as possible.

This object is achieved by a device and a method according to the independent claims. Special embodiments are described in the dependent claims.

What is put forward therefore is a device for the crucible-free melting of a material and for atomising the melted material for manufacturing powder, comprising
  an atomisation nozzle;
  an induction coil with windings, which at least in sections become narrower in the direction towards the induction coil; and
  a material rod which is introduced at least partly into the induction coil;
  wherein the induction coil is configured to melt the material of the material rod for producing a melt flow; and
  wherein the induction coil and the atomisation nozzle are arranged in a manner such that the melt flow can be introduced into the atomisation nozzle through a first opening of the atomisation nozzle, for atomisation the melt flow by way of an atomisation gas which can be introduced into the atomisation nozzle.

The atomisation nozzle is designed in a manner such that the atomisation gas can only be introduced or is only introduced into the atomisation nozzle through the mentioned first opening of the atomisation nozzle. Moreover, the atomisation nozzle is configured to accelerate the atomisation gas in a direction parallel to the melt flow, preferably parallel to a flow direction of the melt flow through the atomisation nozzle, at least up to the speed of sound of the atomisation gas. The material rod and the induction coil are moreover arranged in a manner such that the melt flow is inductively heatable or heated by the induction coil, before entry of the melt flow into the atomisation nozzle, thus typically in a region between an end of the material rod which faces the atomisation nozzle, and the atomisation nozzle. The induction coil, in particular at its end which faces the atomisation nozzle, is designed in a manner such that the melt flow, where it freely flows, is inductively heatable or heated, such that it does not cool down. It is heated for example in a manner such that it retains its minimum temperature necessary for the atomisation process. The melt flow is mostly subjected to the atomisation gas in the region, in which the melt flow freely flows, thus normally between the end of the material rod which faces the atomisation nozzle, and the atomisation nozzle, said atomisation gas enclosing and flowing around the melt flow there at all sides.

What is also suggested in a method for manufacturing powder by way of crucible-free melting of a material and by way of atomisation of the melted material, comprising the steps:
at least partly introducing a material rod into an induction coil which tapers conically at least in sections;
subjecting the induction coil to an alternating voltage for melting the material rod and for producing a melt flow;
introducing the melt flow into an atomisation nozzle through a first opening of the atomisation nozzle; and
introducing an atomisation gas into the atomisation nozzle and atomising the melt flow by way of the atomisation gas;
wherein the atomisation gas is only introduced into the atomisation nozzle through the first opening of the atomisation nozzle;
wherein the atomisation gas which is to be introduced and/or is introduced into the atomisation nozzle through the first opening is accelerated in a direction parallel to a flow direction of the melt flow, preferably parallel to a flow direction of the melt flow through the atomisation nozzle, at least up to the speed of the sound of the atomisation gas, so that the melt flow is divided up or even bursts and powder with a grain size in the micrometer range and/or sub-micrometer range is produced; and
wherein the melt jet is inductively heated by the induction coil before the entry of the melt jet into the atomisation nozzle.

The atomisation nozzle, the induction coil and the material rod, for the sake of simplicity are hereinafter also called nozzle, coil and rod. The complete or essentially the complete atomisation gas which is envisaged for atomising the melt is introduced into the nozzle through the same first opening of the nozzle as the melt flow. The first opening of the nozzle usually faces the coil and the rod. Then it is normally the atomisation gas and the completely or partly pulverised melt flow which exits again out of the nozzle through a second opening of the nozzle. The nozzle thus apart from the first and the second opening preferably comprises no further openings, in particular no lateral openings, for introducing gas perpendicularly or essentially perpendicular to the nozzle axis, as is the case e.g. with the devices according to DE4201101A1 and EP1765536B1.

It has been found that a multitude of different materials can be atomised in a crucible-free manner for manufacturing powder with very good results with the device suggested here and with the method suggested here. Thus powder with a narrow grain diameter distribution width can be manufactured, wherein the desired grain diameter and distribution can be well set by a number of process parameters and/or device parameters. A significant advantage lies in the fact that materials Which cannot be melted in a crucible due to the fact that the material which is to be nozzle atomised at very high temperatures melts the crucible material or reacts with this and thus becomes impure, can also be atomised. A cooling or freezing of the melt flow before the atomisation is effectively prevented by way of the heating of the melt flow by way of the coil.

Normally, the material rod, the coil and the atomisation nozzle are aligned along a vertical direction, along which the gravity acts. The melt flow then falls through the atomisation nozzle under the influence of gravity or at least also under the influence of gravity. The rod, the coil and the nozzle can each have a cylindrical symmetry or approximately a cylindrical symmetry, wherein the rod, the coil and the nozzle are then typically arranged in a manner such that their axes of symmetry are arranged on the same straight line. The rod, the coil and the nozzle however can also basically have arbitrarily shaped cross sections. The nozzle for example can have a slot-like, rectangular, oval or round cross section. The rod can likewise have a round, oval or polygonal cross section. The rod can also be designed in a plate-shaped manner. The shapes of the coil and the nozzle are then to be accordingly adapted to the plate shape of the rod.

The coil usually comprises at least three windings, preferably between three and six windings. The dimensions of the coil and the rod are preferably adapted to one another, so that a more efficient energy transfer from the coil onto the rod can be effected for melting the rod. The coil is preferably subjected to an alternating voltage f, which lies roughly between 50 kHz and 200 kHz, preferably between 100 kHz and 150 kHz. The coil is usually operated with a power between 10 and 150 kW for melting the rod, depending of the material of the rod.

A cross-sectional area of the nozzle along the nozzle axis in the flow direction of the melt flow through the nozzle can reduce in a continuous manner or at least in sections. The cross-sectional area of the nozzle along the nozzle axis in the flow direction for example can reduce linearly or more greatly than linearly. The nozzle can e.g. be designed as a Laval nozzle.

The Laval nozzle can then have a contour which runs out radially far from the axis of the Laval nozzle, so that the flow from the condition of calm environment to the accelerated gas is led through the Laval nozzle already at a large distance to the axis of the Laval nozzle. A diameter of the contour of the Laval nozzle e.g. in the region of the first opening of the nozzle can be roughly 0.5 times to threefold the coil diameter, preferably 0.8 to double. With regard to the mentioned coil diameter, it can be the case of the coil diameter at the end of the coil which is away from the nozzle or the end of the coil which faces the nozzle.

One variant is the co-called two-stage nozzle, with which two differently curved nozzle contours merge into one another such that an annular edge arises in a plane perpendicular to the nozzle axis.

The device typically comprises a lifting and lowering device for holding, lifting and lowering the material rod. The rod e.g. is continuously fed into the coil, in order to hold the position of the end of the rod which faces the nozzle and at which the rod is predominately melted, approximately constant during the implementation of the method. The lifting and lowering device is preferably additionally configured to rotate the rod about the rod axis, e.g. at a rotation speed of at least 1 $min^{-1}$, so that the melting of the rod is effected as uniformly as possible.

If hereinafter, one speaks of the material rod, the material rod is to be understood in that it is solid and not yet melted. The melt or the melt flow, in particular with regard to the distance measurements between the rod and other components of the device are not to be considered as part of the material rod.

The material, from which the rod is formed, can comprise metal or ceramic. The material of the material rod, from which the powder is manufactured, can e.g. contain one of the following metals or an alloy of one or more of the following metals: titanium, aluminium, iron, zirconium, hafnium, vanadium, niobium, tantalum, chromium, molybdenum, wolfram, rhenium, nickel, cobalt.

Powder with a mass-related mean grain diameter of less than 50 μm can be manufactured with the suggested method. The mean mass-related grain diameter can also be less than 10 μm or less than 1 μm.

A width of the grain size distribution of the manufactured powder can be characterised by the diameter $d_{84}$ and $d_{50}$. These are defined as follows:

84 percent of the powder (percentage by weight) has a grain diameter which is smaller than $d_{84}$ and 50% of the powder (percentage by weight) has a grain diameter which is smaller than $d_{50}$.

E.g. powder with which: $d_{84}/d_{50} \leq 2.8$, preferably $d_{84}/d_{50} \leq 2.3$, in particular $d_{84}/d_{50} \leq 1.8$ can be manufactured with the suggested method.

A smallest inner diameter $d_{min}$ of the atomisation nozzle can be smaller than 7 mm, preferably smaller than 5 mm, particularly preferably smaller than 3 mm for achieving a particularly narrow grain size distribution. The inner diameter is thereby to be determined in each case perpendicularly to the nozzle axis or perpendicularly to the flow direction of the melt flow through the nozzle. Typically, the smallest diameter occurs at the position along the nozzle axis, at which the nozzle or the nozzle tube has the smallest cross-sectional area. The inner diameter is preferably determined along a straight line which runs through the middle point of the cross section.

A plane, which perpendicularly intersects the nozzle axis or the flow direction of the melt flow through the nozzle, and specifically at that position along the nozzle axis or along the flow direction, at which the cross-sectional area of the atomisation nozzle, in particular thus the cross-sectional area of the channel formed by the nozzle, is minimal, can serve for the characterisation of the device. This plane hereinafter also is indicated as the plane of the narrowest cross section for the sake of simplicity.

Constructional measures can be undertaken, in order to feed the melt to the nozzle in an adequately close manner, so that it can be captured as much as possible by the gas flow of the atomisation gas, in the described manner. A preferred maximal distance of the melting region to the nozzle results due to the necessary proximity of the coil to the material rod, indeed in the lowermost region wherein the melting is to take place in a complete manner, so that no remains of the rod remain asymmetrically or out-of-centre, thus Where a cooling and freezing of the melt flow on the way to the nozzle due to the cooling by the gas flow which is mostly cold for energetic reasons and captures and accelerates the melt flow, should be avoided at all costs. A pressure increase in the inside of the melt jet due to shear stresses between the quicker gas flow and it, is preferably effected on this path to the narrowest cross section of the nozzle, whereas with other methods, a cold gas is in contact with the melt only Dora relatively short time, since it has no common direction with this, neither before nor after this contact—at the most stochastically, thus in random parts, and moreover neither needs a long contact time since the gas already has the high kinetic energy and therefore no longer, common paths with a possible and undesired cooling are covered.

The material rod and the atomisation nozzle for this reason can therefore be arranged in a manner such that a smallest distance L between the material rod and the plane of the narrowest cross section is smaller than $7 \cdot d_{min}$, smaller that $6 \cdot d_{min}$, smaller than $5 \cdot d_{min}$, or smaller than $4 \cdot d_{min}$. One can therefore counteract too high a cooling of the melt flow before atomisation for example. The rod at the end of the rod which faces the nozzle typically roughly has a cone shape, L is then usually the distance of the cone tip to the plane of the narrowest cross section.

The atomisation nozzle and the induction coil are preferably designed as separate components. The induction coil in particular is therefore not then integrated into the nozzle. In the flow direction, the coil with this embodiment is normally arranged in front of or above the nozzle. The device is particularly flexible with this. The coil for example can be easily exchanged or adjusted relative to the nozzle. Moreover, one can more effectively prevent the nozzle being heated too much or even melted by the coil.

The induction coil and the atomisation nozzle can be arranged to one another such that a smallest distance $a_{min}$ between the induction coil and the plane of the narrowest cross section is smaller than $4 \cdot d_{min}$, smaller than $3 \cdot d_{min}$ or smaller than $2 \cdot d_{min}$, in order to avoid too great a cooling or even a freezing of the melt flow before the atomisation, and to be able to assist the flow of the melt flow. Preferably, the distance $a_{min}$ is thereby determined in a direction parallel to the nozzle axis or parallel to the flow direction of the melt flow. The coil can also reach directly up to the nozzle or be in contact with the nozzle. The nozzle in this case above all should be of a non-conductive material The nozzle can be of a material which is either a very good or very poor electrical conductor, in order to prevent an electromagnetic coupling of the nozzle to the coil and to avoid an inductive heating of the nozzle by the cod as much as possible. Ohmic loses which are dissipated in the nozzle in the form of heat hardly occur in the case that the nozzle material is a very good conductor. If in contrast the nozzle material is a very poor conductor, then no or hardly any eddy currents are induced in the nozzle, which likewise leads to no or hardly any ohmic losses. For this reason $\rho \leq 0.02 \cdot 10^{-6}$ Ωm or $\rho \leq 10^{-2}$ Ωm for the specific electrical resistance of the nozzle material.

A further special embodiment of the device is characterised by a high-pressure chamber, an atomisation Chamber which is in fluid connection with the high-pressure chamber via the atomisation nozzle, first pressure control means for introducing the atomisation gas into the high-pressure chamber and for the [closed-loop] control of a first gas pressure $p_1$ in the high-pressure chamber, as well as second pressure control means for the control of a second gas pressure $p_2$ in the atomisation chamber, wherein the first and the second pressure control means are configured to set the pressures $p_1$ and $p_2$ for accelerating the atomisation gas in a direction parallel to the flow direction of the melt flow, in a manner such that: $p_1/p_2 > 1.8$ and $p_1 > 10$ bar. The first gas pressure $p_1$ is thus greater than the second gas pressure $p_2$.

The second gas pressure $p_2$ in the atomisation chamber is typically about 1 bar. The acceleration of the atomisation gas in front of the nozzle, in the inside of the nozzle and behind the nozzle can be influenced and controlled by way of the setting of the gas pressures $p_1$ and $p_2$. Thus the shear stresses which are transmitted by the atomisation gas onto the melt flow, and, as the case may be, the degree of centring and stretching of the melt flow can also be influenced, in particular already before the entry of the melt flow into the nozzle and/or before the atomisation of the melt flow. The first and second pressure control means can e.g. each comprise one or more pumps, conduits, nozzles, valves, a compressor and/or a high-pressure gas tank.

It is particularly advantageous to heat the material rod in an as effective and as uniform as possible manner, above all at its end facing the nozzle, thus typically at the lower end, since it is here that the melting of the rod takes pace. The end of the material rod facing the nozzle should also be arranged within the coil, thus in the flow direction preferably should not project beyond the end of the coil which faces the nozzle.

Moreover, is advantageous if at least one of the windings of the induction coil which is arranged in the region of the end of the material rod which faces the nozzle, runs perpendicularly to the rod axis at least in sections, for producing an electromagnetic field Which with respect to the rod axis is as symmetrical as possible in this region. At least the last winding of the coil which faces the nozzle, at least in sections, preferably runs perpendicularly to the rod axis or to the flow direction of the melt flow. At least the last winding can preferably completely or almost completely enclose the rod axis or an imagined extension of the rod axis in a plane perpendicular or almost perpendicular to the rod axis.

Thus at least one of the windings, in particular the last winding can be designed as a ring conductor which is electrically interrupted at one location, preferably as an almost closed ring conductor. The interruption can be realised as an air gap or by way of an insulating material. The term ring conductor should not only include conductors in the shape of a ring, but rather it is to include a multitude of shapes. What is decisive is the fact that the ring conductor over the greatest part of its length runs essentially in a plane and forms an almost closed conductor loop. For example, the ring conductor can run at least 50 percent, at least 70 percent or at least 90 percent in a plane perpendicular or essentially perpendicular to the rod axis or perpendicularly or essentially perpendicularly to the flow direction of the melt flow. The ring conductor can enclose the rod axis or an imagined extension of the rod axis by at least 180 degrees, by at least 225 degrees, by at least 270 degrees, by at least 315 degrees or by almost 360 degrees perpendicularly or almost perpendicularly to the rod axis. The ring conductor can be designed in a predominantly circular, oval, rectangular or polygonal manner. It can have roughly the shape of a horseshoe. The ring conductor does not need to have a symmetrical shape. The ring conductor however is preferably arranged rotationally symmetrically or almost rotationally symmetrically to the rod axis or the flow direction of the melt flow. The ring conductor can thus e.g. be designed in a roughly circular manner.

With a special embodiment, the coil can comprises at least two ring conductors of the described type. The at least two ring conductors can be formed from the same conductor material, e.g. of copper. The at least two ring conductors can be connected electrically in parallel. The ring conductors can have cross sections which are formed with a different periphery (perimeter, circumference) and/or have different distances along the rod axis, so that the ring conductors connected in parallel each have roughly the same electrical resistance and/or produce an as homogeneous as possible field distribution along the rod axis. With regard to the mentioned cross section, it is the case of the cross section of the conductor tube or the conductor wire of the ring conductor. A first ring conductor and a second ring conductor for example can be connected in parallel, wherein the first ring conductor has a larger periphery than the second ring conductor. A distance of the first ring conductor to the nozzle for example is larger than a distance of the second ring conductor to the nozzle. In this case the cross section of the first ring conductor can be enlarged compared to the cross section of the second ring conductor.

The induction coil at least in sections can be wound in a spiral manner and specifically in a preferably continuous manner with a pitch which with respect to a direction parallel to the rod axis is different to zero, wherein the windings in this section run on the envelope of a cone symmetrical to the rod axis. The windings or turns of the coil, in sections or continuously for example can have an angle of more than 5 degrees, of more than 10 degrees or more than 15 degrees to a plane which is perpendicular to the rod axis.

A conductor forming the induction coil can be designed as a hollow tube for leading a cooling fluid, so as to cool the induction coil. A cross section of the hollow tube can be circular, oval or rectangular. The hollow tube can be designed as a double hollow tube which comprises two separate hollow chambers, for the feed flow and return flow.

A shield which follows the contour of the rod, e.g. one which is rotationally symmetrical, and which is open to the nozzle can be arranged between the rod and the coil as one variant of the heating, for melting and atomising electrically non-conductive materials such as ceramics. The shield is preferably formed from a material which is resistant to high temperatures and which inductively couples, e.g. of platinum. The shield is normally itself heated inductively and releases heat to the rod by way of thermal radiation.

The rod itself can be designed as a crucible, as a return of unusable residual powder, material dust and chippings. For this, the rod can suitable have fillable cavities. Such a cavity can e.g. be a cylindrical recess in the core, into which the residual material can be filled.

Powder with a particularly narrow grain size distribution can be manufactured by way of the atomisation gas being accelerated parallel to the flow direction of the melt flow along a comparatively short acceleration path with a length $L_B$, at least to the speed of sound of the atomisation gas. For example, it can be that $L_B \leq 5 \cdot d_{min}$, wherein $d_{min}$ is the already mentioned smallest diameter of the atomisation nozzle perpendicular to the atomisation axis. The speed v of the atomisation gas parallel to the flow direction, thus on running through a path with a length $L_B$ is changed by an amount $\Delta v$, wherein e.g. it is that $\Delta v \leq 0.9 \cdot v_0$, wherein $v_0$ indicates the speed of sound of the atomisation gas.

The device which is suggested here additionally to the previous described atomisation nozzle can yet comprise a further nozzle, which is arranged aligned to the atomisation nozzle, so that the melt flow can also be led or is led through the further nozzle. The further nozzle can be designed in a manner such that it accelerates a gas which is introduced with the melt flow into the further nozzle, in a direction parallel to the melt flow, at least up to 0.5 times the speed of sound of the gas introduced into the further nozzle, and specifically preferably in a laminar manner. E.g. the further nozzle can have across section which tapers monotonously or strictly monotonously in the flow direction of the melt flow. The further nozzle for example can also be designed as a Laval nozzle. The dimensions of the second nozzle can differ from those of the atomisation nozzle. E.g. a smallest cross section of the further nozzle can be larger than the smallest diameter of the atomisation nozzle.

The further nozzle is preferably arranged between the material rod and the atomisation nozzle, thus in front of the atomisation nozzle in the flow direction of the melt flow. In particular it can then serve for accelerating the gas introduced into the further nozzle, even before its entry into the atomisation nozzle. Alternatively or additionally to this, the further nozzle can centre and/or stretch and accelerate the melt flow already before its entry into the atomisation nozzle. However, arrangements with which the further nozzle is arranged behind the atomisation nozzle in the flow direction of the melt flow are also conceivable.

Embodiment examples of the invention are represented in the drawings and are explained in more detail by way of the subsequent description. There are shown in.

Figure 1:
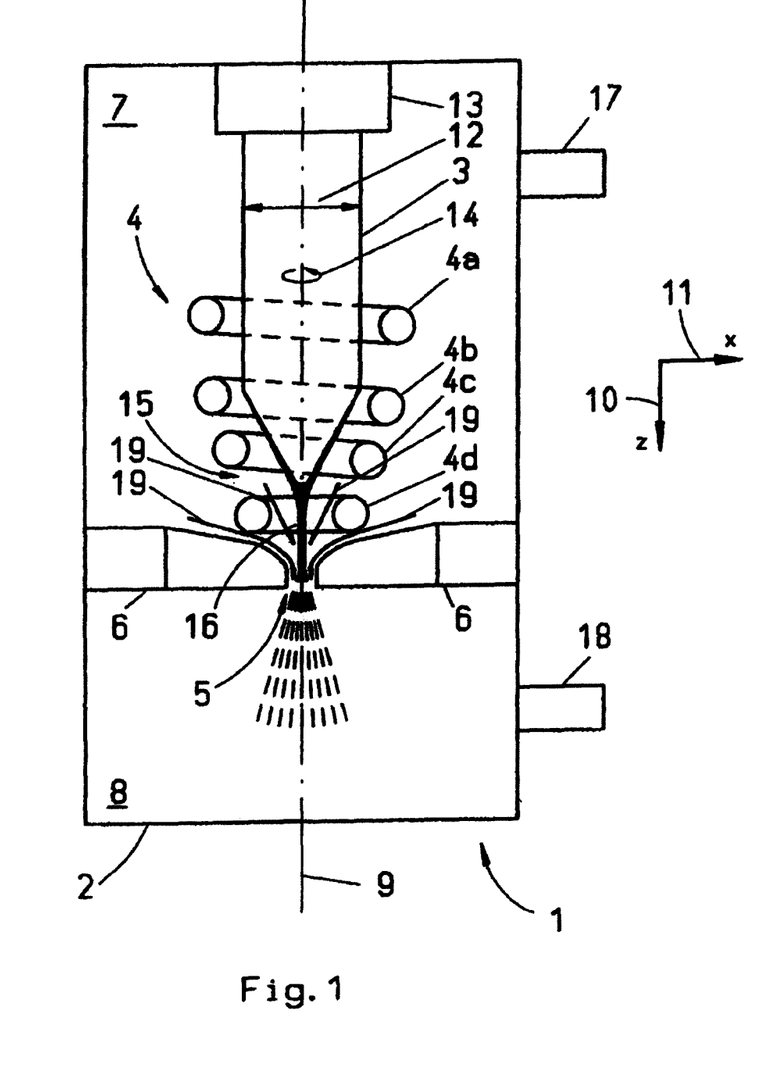
FIG. 1 schematically, a sectioned representation of a device according to the invention for melting a material and for atomising the material into powder, wherein the device comprises a material rod, an induction coil and an atomisation nozzle.

FIG. 1 schematically shows a sectioned representation of an embodiment example of a device 1 according to the invention, for the crucible-free melting a material, here titanium, and for atomising the material into powder. The device 1 comprises a container 2, in which a material rod 3, an induction coil 4 and an atomisation nozzle 5 are arranged. The rod 3, the coil 4 and the nozzle 5 are each aligned in a cylinder-symmetrical or approximately cylinder-symmetrical manner and along a vertical axis 9. An axis of symmetry of the rod 3, an axis of symmetry of the coil 4 and an axis of symmetry of the nozzle 5 each coincide with the axis 9. This axis runs parallel to a z-direction 10, along which gravity acts. An x-direction or lateral direction 11 runs perpendicularly to the z-direction 10. The coil 4 and the nozzle 5 in particular are designed as separate components. The coil 4 is arranged above the nozzle 5 and is distanced to this along the z-direction.

The material rod 3 here is formed from titanium and is partly inserted into the coil 4. A lifting/lowering device 13 is configured to hold the rod 3 and to move it along the positive and negative z-direction 10. The lifting/lowering device 13 can moreover rotate the rod 3 about the rod axis with a rotation speed of up to 200 min$^{-1}$, as is indicated by the arrow 14. The coil 4 engages the rod 3 at its lower end facing the nozzle 5 and encloses it. A cross section of the rod which is determined or defined perpendicular to the rod axis e.g. has a rod diameter of 12 to 40 mm. The coil 4 in the region of the windings 4a and 4b has a somewhat larger diameter than the rod 3. The coil 4 here is formed from copper and comprises a number of windings 4a-d. The windings 4a-d at least in sections become narrower in the direction to the nozzle 5. The first winding 4a at the end of the coil 4 which is away from the nozzle 5 for example has a larger winding diameter than the last winding 4d which faces the nozzle 5.

An interior of the container 2 is divided by way of a separating or partition wall 6 into a high-pressure chamber 7 situated above the separating wall 6, and into an atomisation chamber 8 situated below the separating wall 6, wherein the high-pressure chamber 7 and the atomisation chamber 8 are in fluid connection via the nozzle 5. The coil 4 and the material rod 3 are arranged in the high-pressure chamber 7. A first gas pressure $p_1$ in the high-pressure chamber 7, and a second gas pressure $p_2$ in the atomisation chamber 8 can be set via first pressure control means 17 and second pressure control means 18. The first pressure control means e.g. comprise a high-pressure gas accumulator with argon, a high-pressure conduit and a high-pressure valve, via which the argon gas can be introduced into the high-pressure chamber 7. The second pressure control means 18 e.g. comprise a discharge air valve and a discharge air conduit. Here, the first gas pressure $p_1$ is controlled to 15 bar and the second gas pressure $p_2$ to approx. 1 bar, so that it is roughly the case $p_1/p_2=15$.

The coil 4 is operated by an alternating current source of approx. 100 kHz and which is not shown here, and with an electrical power of approx 20 kW. The coil, on account of this, induces magnetic alternating fields in the electrically conductive rod 3. The rod 3 is inductively heated in this manner, so that it is melted at least on the surface, at the lower rod end 15 facing the nozzle 5. A melt flow 16 which flows downwards in the z-direction results by way of this.

Figure 2:
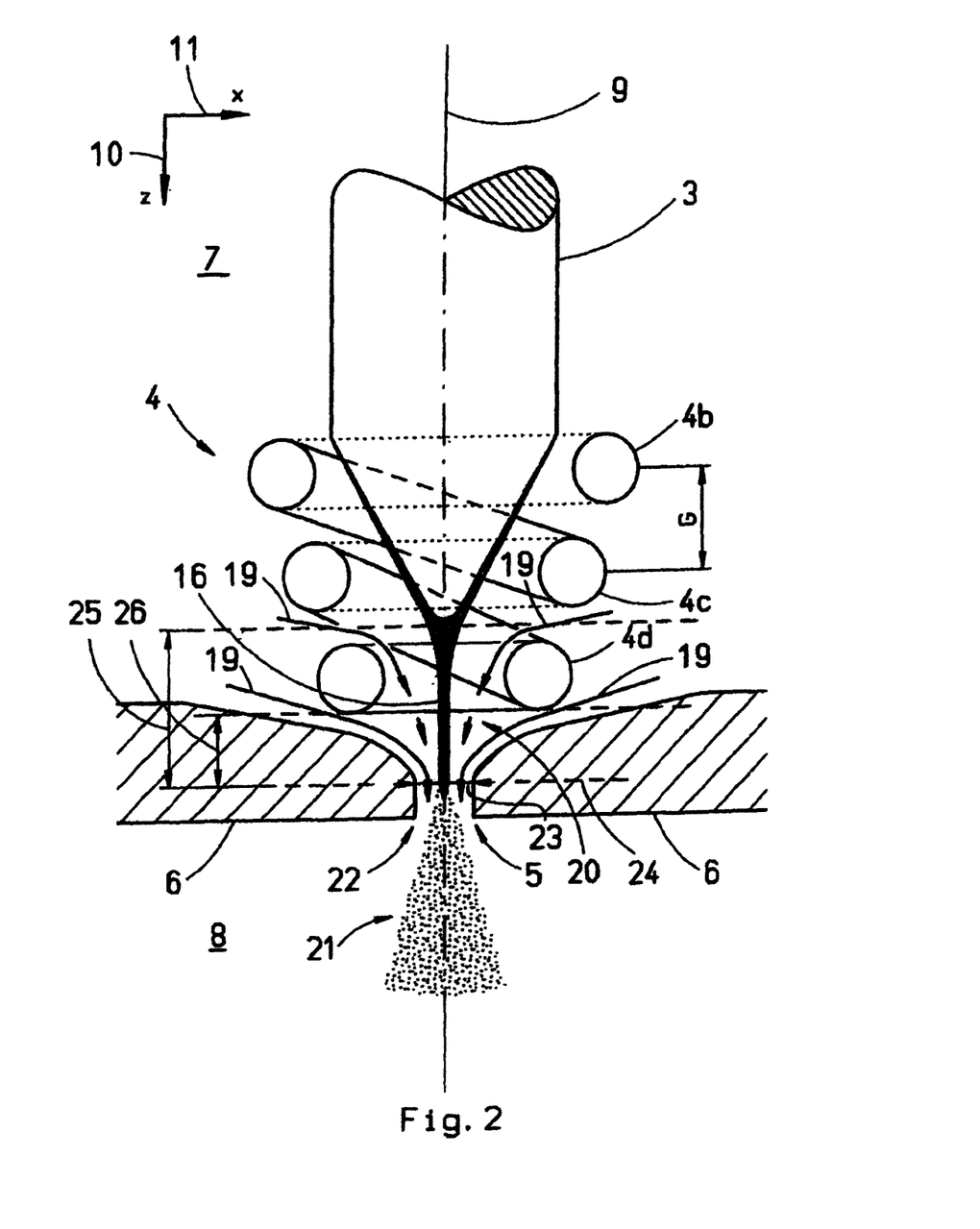
FIG. 2 schematically, an enlarged representation of the material rod, of the induction coil and of the atomisation nozzle from FIG. 1.

The rod end 15 of the rod 3 which faces the nozzle 5, and the coil 4 and the nozzle 5 are shown in a slightly enlarged representation in FIG. 2. Here and hereinafter, recurring features are each provided with the same reference numerals. The continuous melt flow 16 which is produced by way of the inductive heating of the rod 3 flows downwards in the z-direction 10 and is introduced into the nozzle through a first opening 20 of the nozzle 5 which faces the coil 4 and the rod 4. The nozzle 5 is designed as a Laval nozzle. The shape of the nozzle 5, in combination with the pressure difference between the first gas pressure $p_1$ in the high-pressure chamber 7 and the second gas pressure $p_2$ in the atomisation chamber 8 effects an acceleration of the atomisation gas in the z-reaction, emphasised here by arrows 19. Here, the atomisation gas 19 is accelerated in the z-direction 10 and is introduced through the first opening 20 into the nozzle 5. The method which is suggested here can be carried out with comparably little effort with regard to energy, since in particular, it is not necessary to preheat the atomisation gas 19. The nozzle 5 is in fluid connection with the high-pressure chamber 7 only via the first opening 20. The atomisation gas 19 is thus introduced into the nozzle 5 exclusively through the first opening 20.

The melt flow 16 is now engaged and centred by the laminar flow of the atomisation gas 19 which is accelerated in a laminar manner in the z-direction. The melt flow 16 then together with this accelerating gas flow is led through the first opening 20 into the nozzle 5 and is led through the nozzle 5. Shear stresses are transmitted onto the melt flowing more slowly in the z-direction 10, due to the quicker atomisation gas 19. This transfer is effected analogously to an inverse wall shear stress in the case of laminar pipe flow, and in the flow direction causes an increase of the pressure in the inside of the melt flow 16. In contrast, on account of the shape of the Laval nozzle 5, a pressure drop is effected in the flow of the atomisation gas 19 which gets quicker and quicker. The melt flow 16 bursts and is atomised into droplets 21, as soon as the inner pressure of the melt flow 16 becomes too large. The melt flow 16 or the droplets 31 now get through the second opening 22 of the nozzle 5 into the atomisation chamber. The second opening 22 is the only fluid connection between the nozzle 5 and the atomisation chamber 8.

Thus a narrowly distributed, spherically and very fine powder of the melted material arises after the cooling and freezing of the droplets. A titanium powder with a mass-related mean grain diameter of 51 µm is produced in the present, described embodiment. It is then the case that $d_{84}/d_{50} \leq 2.6$ for the width of the grain diameter distribution of the thus produced titanium powder.

A parameter which is significant for the production of a high-quality powder is the minimal nozzle cross section, characterised by the smallest inner diameter $d_{min}$ (reference numeral 23) of the atomisation nozzle 5. Here, $d_{min}$=6 mm. A plane 24 perpendicular to the nozzle axis 9 is emphasised in FIG. 2, in which plane the cross-sectional area of the nozzle is minimal and in which the inner diameter of the nozzle 5 assumes its smallest value $d_{min}$.

It is advantageous to lead the rod 3 as closely as possible to the nozzle 5, in order to counteract the cooling or freezing of the melt flow 15 before the atomisation. Here, the rod 3 and the nozzle 5 are arranged in a manner such that a smallest distance 25 between the plane 24 and the rod 3 roughly amounts to only threefold $d_{min}$, thus approx. 18 mm.

The mechanical energy which is fed or which is to be fed to the melt flow 16 for atomisation is preferably incorporated into the melt flow 16 by way of shear stresses of an initially resting or essentially resting flow of the atomisation gas 19 which is not laminarly accelerated until together with the melt flow 16. The nozzle 5 is designed in a manner such that the flow of the atomisation gas 10 remains laminar up to the atomisation of the melt flow 16. The melt flow 16 is thus captured by the even slower flow of the atomisation gas 19, accelerated, stretched along the flow direction and tapered. The energy which is necessary for atomisation can already be transmitted onto the melt flow 16 before this flows through the nozzle 5.

The distance 25 between the rod 3 and the plane 24 of the narrowest nozzle cross section and which is comparatively small with the device described here thus moreover has the effect that the atomisation gas is accelerated parallel to the flow direction of the melt flow 16 along an acceleration path which is shorter than the distance 25 between the rod and the pane 24, at least up to the speed of sound of the atomisation gas 19. The length of the acceleration path here therefore in particular is less than threefold $d_{min}$. The atomisation gas 19 achieves the speed of sound when it passes the plane 24 of the narrowest cross section.

A further effective measure, with which the cooling or freezing of the melt flow 16 before the atomisation is prevented, lies in leading the coil 4 as closely as possible to the nozzle, so that the melt flow 16 before entry into the nozzle 5 where possible still flows within the cool and is enclosed or encompassed at least by the last winding 4d of the coil 4. In the example represented here, the smallest distance $a_{min}$ (reference numeral 26) between the end of the coil 4 which faces the nozzle 5, and the plane 24 of the narrowest nozzle cross section, is less than double $d_{min}$, thus less than approx. 12 mm.

The rod 3, the coil 4 and the nozzle 5, as is shown in FIG. 2, are arranged in a manner such that the melt flow 16 continues to be heated by the coil 4, in particular at least the by last winding 4d, in a region between the end of the rod 3 which faces the nozzle 5, and the nozzle 5, or between the end of the rod 3 which faces the nozzle 5, and the plane 24 of the narrowest nozzle cross section. For this reason, at least the last winding 4d is arranged between the end of the rod which faces the nozzle 5, and the nozzle 5, along the flow direction of the melt flow 16. The winding diameter of the last winding 4d here is smaller than $5 \cdot d_{min}$. The nozzle 5 is predominantly formed from a material whose specific electrical resistance e.g. is larger than $2 \cdot 10^{-2}$ Ωm, in order to simultaneously prevent the nozzle 5 being heated by the coil 4 which is led up close to the nozzle 5.

The melting of the rod 3 at its end facing the nozzle 5 is effected in a particularly efficient manner with the arrangement represented in FIG. 2, since the windings 4b-d in sections are each aligned perpendicularly to the rod axis 9. The sections of adjacent windings which are each aligned perpendicularly to the rod axis 9 are connected by way of oblique sections which each bridge a constant pitch G.

It is important for a melt rate (mass per time) at which the rod 3 is melted, to be large enough to produce a continuous melt flow 16, so that the inductive heating of the jet can be effected in a particularly effective manner. The melt rate should e.g. be at least 0.5 kg per minute or at least 1 kg per minute. The melt rate which is necessary for producing a continuous melt flow 16 is of course dependent on the special characteristics of the melted material and can vary from material to material (e.g. viscosity, surface tension)

Schematic special embodiments of the coil 4 are shows in FIGS. 3 to 7.

Figure 3:
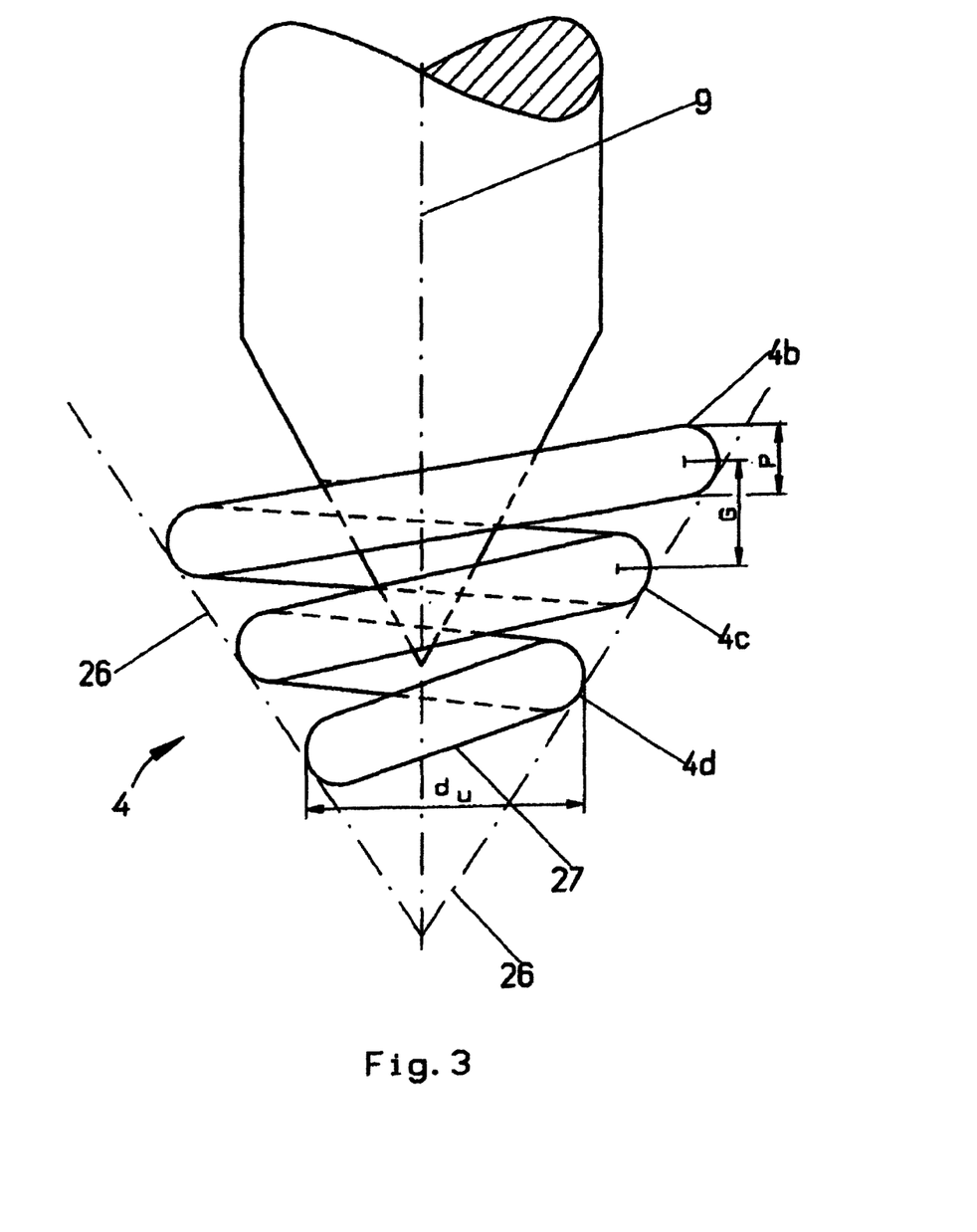
FIG. 3 schematically, a first special embodiment of the induction coil which is shown in FIGS. 1 and 2.

FIG. 3 shows an embodiment of the coil 4, with which the windings 4bd are spirally wound and run on the envelope 26 of an imagined cone, said cone being symmetrical with respect to the rod axis 9. With a complete revolution by 360 degrees, each winding thereby overcomes pitch G. A diameter of a conductor or conduit tube 27 which forms the coil 4 is indicated at P. G is normally somewhat larger than P. It can be for example that $G \geq 1.5 \cdot P$. The conductor 27 is designed as a hollow tube of copper for cooling by way of cooling fluid. The outer diameter P of this hollow tube can e.g. be 12 mm. A wall thickness of the tube can be 2 mm.

Figure 4:
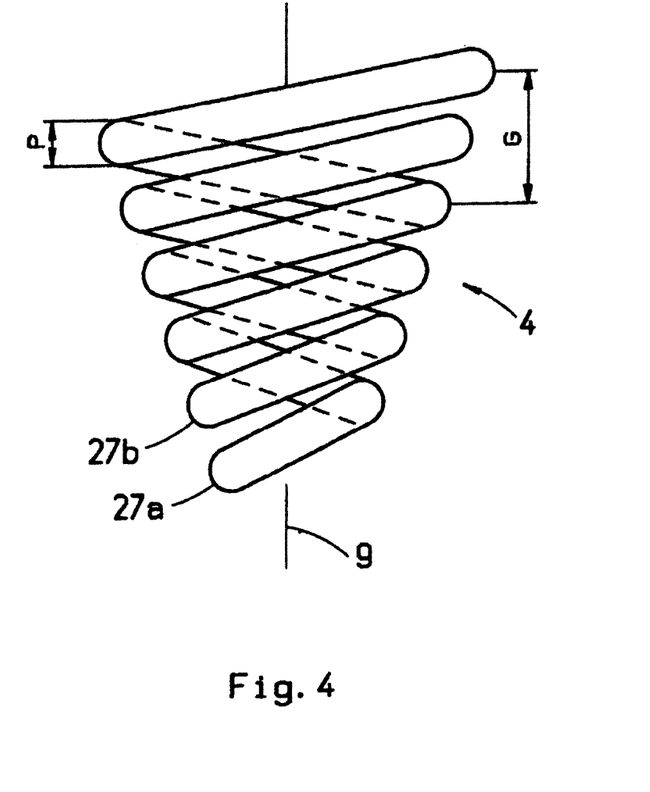
FIG. 4 schematically, a second special embodiment of the induction coil represented in the FIGS. 1 and 2.

The embodiment example of the coil 4 according to FIG. 4 differs from that according to FIG. 3 in that the coil here comprises two conduit tubes 27a and 27b which are connected electrically in parallel and which again are each wound in a spiral manner and become conically narrower towards the lower end. The hollow tubes 27a and 27b are likewise formed from copper. Their outer diameter P here however should only be 6 mm. The wall thickness is only 1 mm. The conduit tubes 27a and 27b can thereby be wound in a significantly simpler manner than the conduit tube 27 according to FIG. 3 The pitch G of the conductors 27a and 27b here is also e.g. 18 mm in each case, but the lowermost diameter $d_u$ is significantly smaller.

Figure 5:
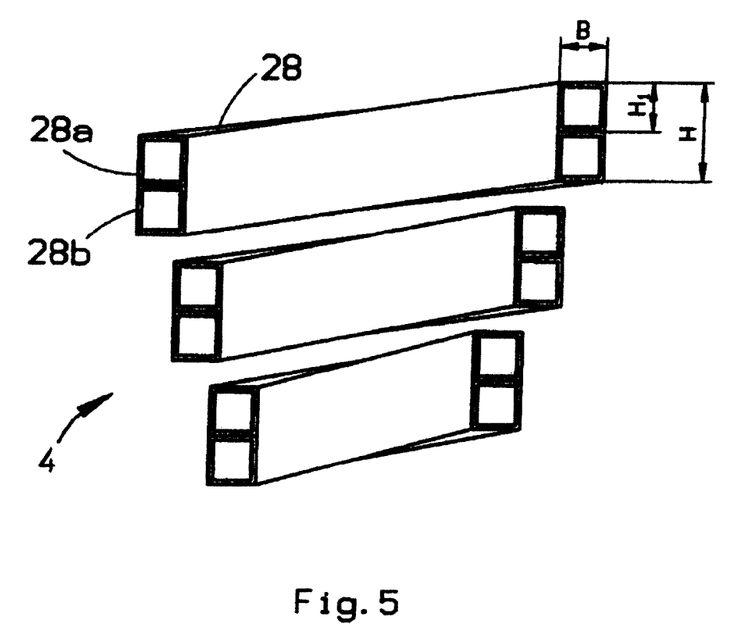
FIG. 5 schematically, a third special embodiment of the induction coil represented in the FIGS. 1 and 2.

With the embodiment of the coil 4 which is shown in FIG. 5, this comprises a conductor 28 which is designed as a double hollow tube with a rectangular cross section. A height of the cross section of the conductor 28 is indicted at H, and a width at B. The double hollow tube comprises two individual hollow tubes 28a and 28b which are joined to one another and whose cavities are separated, are thus not in fluid connection. The hollow tubes 28a and 28b each have a square cross section with a side length $H_i$, wherein $H=2 \cdot H_i$.

Figure 6:
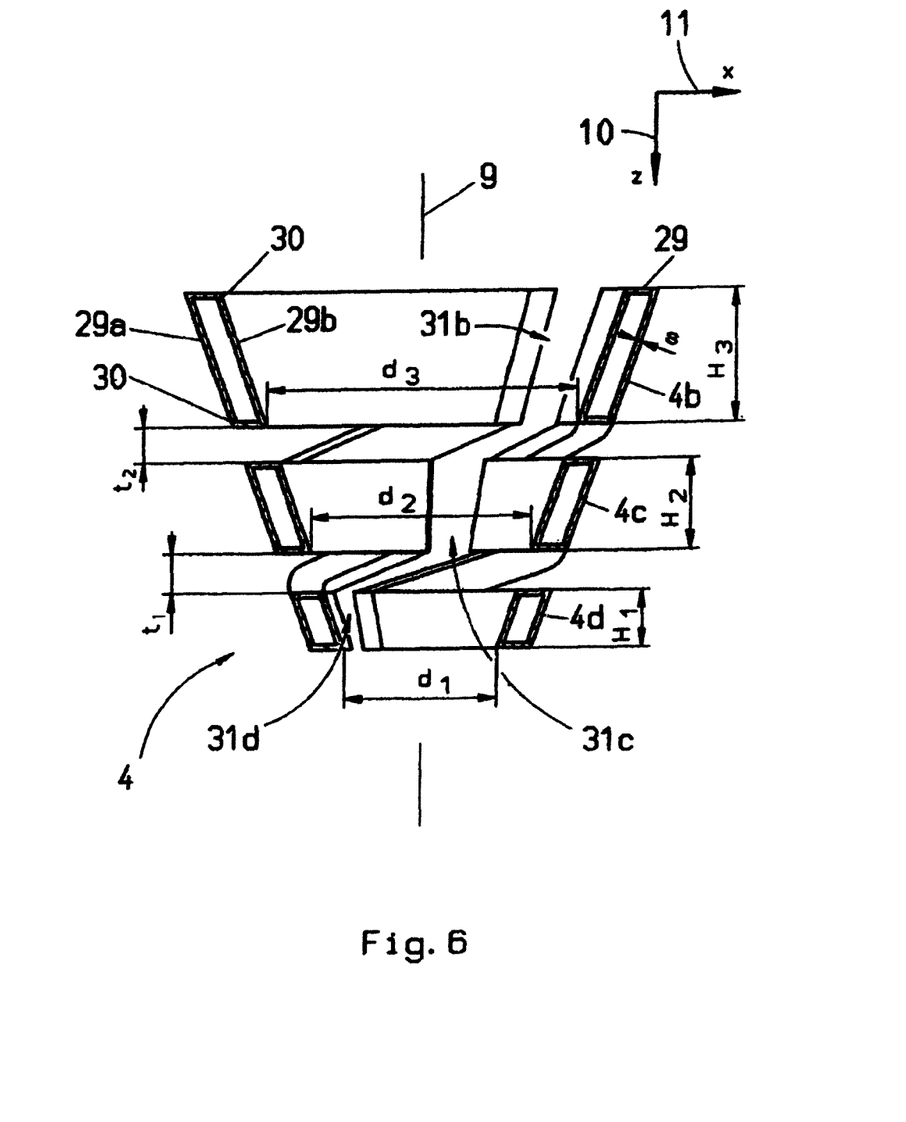
FIG. 6 schematically, a fourth special embodiment of the induction coil represented in the FIGS. 1 and 2.

FIG. 6 shows a further embodiment of the coil 4, with which the windings 4b-d are each designed as sleeves shaped roughly in the manner of a horseshoe, of which each is aligned perpendicularly to the coil axis 9. The coil 4 according to FIG. 9 thus produced fields with a particularly high symmetry with regard to the coil axis 9. The material rod 3 can thus be melted in a particularly uniform manner.

Each of these sleeves forms a ring conductor which is electrically interrupted at one location, and is almost closed, thus encloses the axis 9 in each case by up to 340 degrees. The electrical interruptions are designed as air gaps 31b-d.

The windings 4a-d are connected electrically in parallel and are designed each as a hollow tube for leading a cooling fluid. The hollow tubes forming the windings 4a-d are each composed of two complementary pieces which are L-shaped in cross section. A cross section of each hollow tube therefore has the shape of a parallelogram. The hollow tube 29 forming the winding 4b is composed for example of the pieces 29a and 29b, and these are connected by way of solder connections 30. The outer and inner surfaces of the pieces 29a and 29b in turn form cone sections. The inner diameters $d_1$, $d_2$ and $d_3$ reduce in the z-direction 10. Distances $t_1$ and $t_2$ between the windings and which are determined which is to say defined along the z-direction 10 are equally large.

The windings 4b-d are each manufactured of the same conduit material and each have a different periphery. The flows flowing in the individual windings 4b-d connected in parallel can be adapted by way of giving the windings 4b-d different cross sections in each case, for an as uniform as possible melting of the rod at its lower end. Here, it is shown that the heights $H_1$, $H_2$ and $H_3$ of the windings 4b-d are different in each case. In particular, the heights $H_1$, $H_2$ and $H_3$ e.g. increase linearly from the bottom to the top with the diameters $d_1$, $d_2$ and $d_3$. Due to this, one succeeds in approximately equal flows flowing in each case in the windings which are connected in parallel, so that the rod 3 is melted at its surface at the lower end in an as uniform as possible manner.

Figure 7:
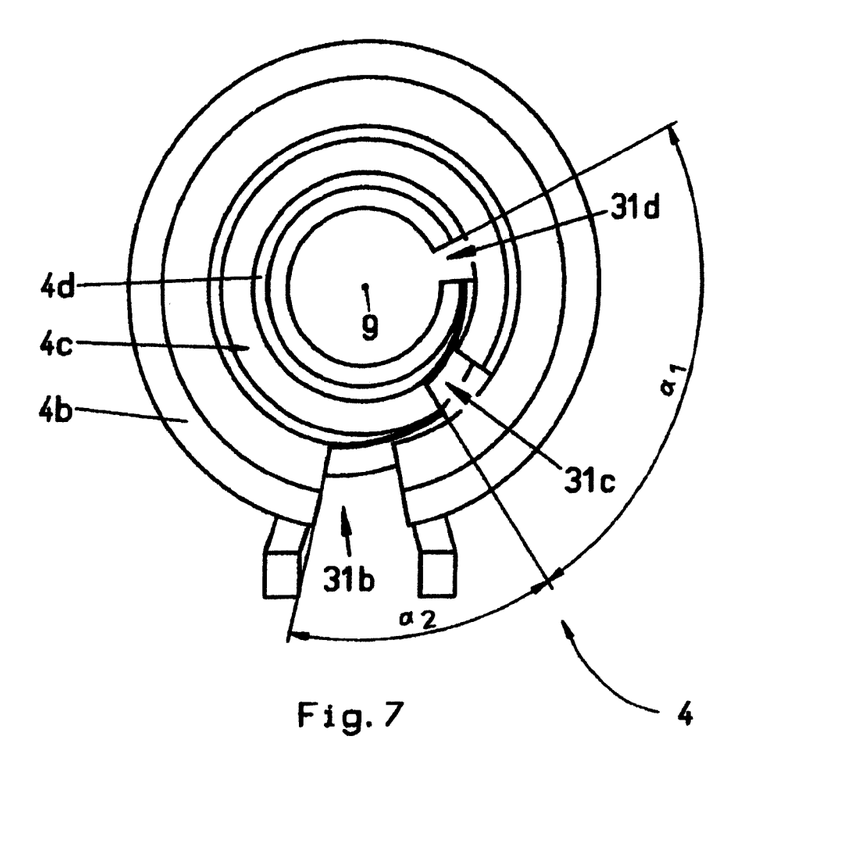
FIG. 7 schematically, a plan view onto the embodiment of the induction coil according to FIG. 6.

The air gaps 31b-d of the different windings 4b-d are additionally rotated to one another by angles $\alpha_1$ and $\alpha_2$, as can be deduced from FIG. 7.

Figure 8:
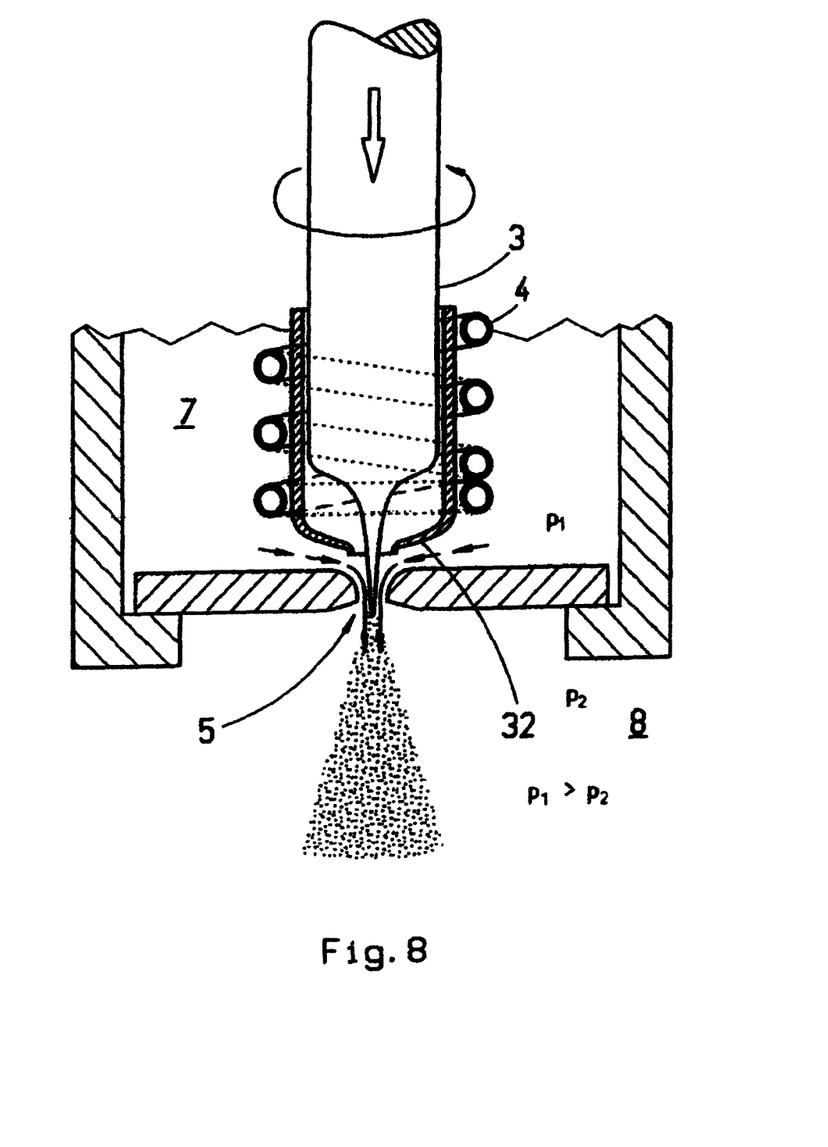
FIG. 8 schematically, a special embodiment for materials which do not inductively couple, such as e.g. ceramic.

FIG. 8 shows an embodiment of the device 1, with which in particular non-inductively coupling materials can be melted, e.g. ceramic. A shield 32 which follows a contour of the rod i.e. is rotationally symmetrical and which is open to the nozzle, is arranged for heating the rod 3 by way of the coil 4. The shield 32 is formed from a material which is high-temperature resistant and which couples in an inductive manner, e.g. of platinum. The shield 32 is itself normally inductively heated and releases heat to the rod by way of thermal radiation.

Trail Results:

With a first trial with a rod of aluminium with a diameter of d=50 mm and which is to be melted, a power of about 14 kW was transmitted by a high-frequency transformer, at a speed of the rod of about 40 min$^{-1}$, and the magnetic field of this transformer was excited at about 105 kHz after coupling in. A dripping and not yet continuous melt flow at a nozzle atomisation pressure (gas pressure in the high-pressure chamber) of 10 bar was produced in the case of a nozzle of a very good conductor, wherein the position of the melting region was not easily to recognise due to the low melt temperature of aluminium.

16 kW was transmitted at 101 kHz in the case of another trial with a 50 mm rod of stainless steel 1.4462. Again, the speed was about 40 min$^{-1}$ and the nozzle was of a good conductor. A continuous melt flow could be produced for a short time at a first gas pressure of 10 bar, otherwise only a dripping material discharge.

Very different powers in the region of approx. 25-35 kW at 107 kHz were transmitted in the case of a further trial with a 38 mm rod of stainless steel 1.4462. The speed was again about 40 min$^{-1}$ and the nozzle this time was of a non-conductor, so that a particularly small distance could be set between the coil and the Laval nozzle. Moreover, the mentioned two-stage nozzle was applied here. A continuous melt flow could be produced at a nozzle atomisation pressure of 20 bar. The mean grain size hereby was $d_{50}=49$ μm and $d_{84}/d_{50}$ was equal to 2.68.

A power of about 35 kW was transferred at a frequency of 112 kHz on nozzle atomisation of titanium rods with 20 mm diameter at a nozzle atomisation pressure of 17-19 bar with respect to atmosphere, with a Laval nozzle of a non-conductor with a two-stage contour. The speed was the same as above. A mean grain size of $d_{50}=51.4$ μm at $d_{84}/d_{50}=2.60$ and in a part-flow of 23.7 μm at $d_{84}/d_{50}=1.78$ resulted.

Figure 9:
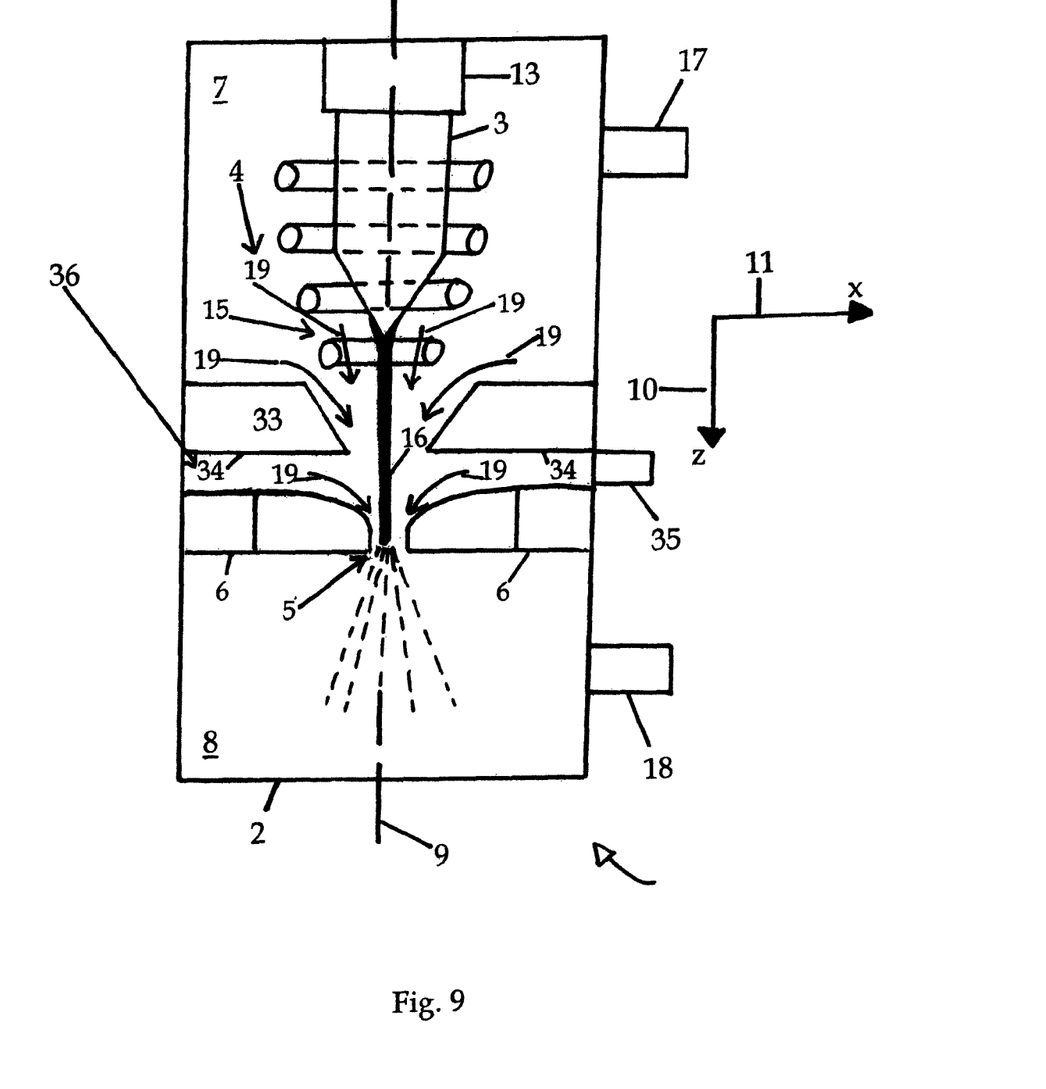
FIG. 9 schematically, a further embodiment of the suggested device, with which a further nozzle is arranged aligned to the atomisation nozzle.

FIG. 9 shows a modified embodiment of the device 1 of FIG. 1. Features which were already previously described and in particular in the context of FIG. 1 continue to be indicated with the same reference numerals. The device 1 according to FIG. 9 differs from the device 1 according to FIG. 1 in that a further separating wall 34 is arranged along the z-direction 10 between the separating wall 6 and the material rod 3. A through-opening in the further separating wall 34 forms a further nozzle 33. A cross section of the further nozzle 33 tapers in the positive z-direction 10, and thus in the flow direction of the melt flow 16, in the shape of a cone. A nozzle axis of the further nozzle 33 coincides with the axis 9, so that the atomisation nozzle 5 and the further nozzle 22 are arranged in an aligned manner.

The melt flow arising at the rod end 15 is this firstly introduced into the further nozzle 33. This is designed in a manner such that it accelerates the atomisation gas 19 entering the further nozzle 33 at the entry opening of this which faces the material rod 3, to at least to 0.5 times the speed of sound of the atomisation gas 19, parallel to the flow direction of the melt flow 16, thus along the positive z-direction 10. The melt flow 16 is thus centred and stretched already before the entry into the atomisation nozzle 5. It has been found that this can improve the quality of the powder produced in the atomisation nozzle 5 to an even greater extent, with regard to the achieved grain size as well as with regard to the achieved grain size distribution width. An area of the smallest cross section of the further nozzle 33 which is determined perpendicularly to the nozzle axis 9 in FIG. 9 is at least fivefold the area of the smallest cross section of the atomisation nozzle 5. However designs of the further nozzle 33 which differ from this are also conceivable A suitable pressure difference is required on both sides of the separating wall 34, so that the further nozzle 33 (pre) accelerates the atomisation gas 19 as described previously. This pressure difference is produced by the previously described first pressure control means 17 and by third pressure control means 35. The third pressure control means as is the case with the first pressure control mans 17 comprise a high-pressure conduit and a pressure control valve, which are connected to a high-pressure gas accumulator with argon and via which argon gas can be introduced into an intermediate space 36 between the separating walls 6 and 34. The pressure control means 17, 18 and 34 for example can be set in a manner such that the gas pressure $p_3$ in the intermediate space 36 is about $p_3=(p_1+p_2)/2$, wherein $p_1$ and $p_2$ as described previously indicate the gas pressure in the high-pressure chamber 7 and in the atomisation chamber 8. The pressure control means 17, 18, 35 in this case are to be set such that $p_2<p_3<p_1$.

The invention claimed is:

1. A device for the crucible-free melting of a material and for atomising the melted material for manufacturing powder, the device comprising:
a Laval nozzle that defines a nozzle axis;
an induction coil with windings, which at least in sections become narrower in the direction towards the Laval nozzle; and a material rod which is introduced at least partly into the induction coil;

wherein:

the induction coil is configured to melt the material of the material rod for producing a melt flow;

the induction coil and the Laval nozzle are arranged in a manner such that the melt flow can be introduced or is introduced into the Laval nozzle through a first opening of the Laval nozzle, for the atomisation of the melt flow by way of an atomisation gas which can be introduced into the Laval nozzle;

the Laval nozzle is configured such that the atomisation gas can only be introduced or is only introduced into the Laval nozzle through said first opening of the Laval nozzle;

the Laval nozzle is configured to accelerate the atomisation gas and to create a laminar flow of the atomization gas in a direction parallel to the melt flow, at least up to the speed of sound of the atomisation gas;

the Laval nozzle and the induction coil are separate components and the induction coil is spaced apart from the Laval nozzle along the nozzle axis;

the induction coil is disposed such and the Laval nozzle is configured such that quantity $a_{min}$ is less than three times quantity $d_{min}$, the quantity $a_{min}$ being a minimum distance between the induction coil and a plane perpendicular to the nozzle axis and defined by a minimal cross-sectional area of the Laval nozzle, the quantity $d_{min}$ being a smallest inner diameter of the Laval nozzle determined within said plane;

the Laval nozzle and the induction coil are configured such that a diameter of a contour of the Laval nozzle perpendicular to the nozzle axis from the first opening of the Laval nozzle is between 0.8 times and three times a diameter of the induction coil perpendicular to the nozzle axis at an end of the induction coil which faces the Laval nozzle; and the material rod, the induction coil, and the Laval nozzle are arranged in a manner such that along the nozzle axis at least a winding of the induction coil facing the Laval nozzle is disposed between the Laval nozzle and an end of the material rod facing the Laval nozzle, so that the melt flow is inductively heatable or heated by the induction coil, before entry of the melt flow into the Laval nozzle.

2. The device according to claim 1, wherein the material, from which the material rod is formed, comprises metal or ceramic, wherein the metal contains at least one of: aluminum, iron, or titanium.

3. The device according to claim 1, wherein the quantity $d_{min}$ is less than 7 mm.

4. The device according to claim 1, wherein the material rod and the Laval nozzle are arranged in a manner such that the material rod and said plane are separated by less than or equal to five times the quantity $d_{min}$.

5. The device according to claim 1, wherein the quantity $a_{min}$ is less than or equal to two times the quantity $d_{min}$.

6. The device according to claim 1, wherein the Laval nozzle, for the minimization of a heat quantity dissipated by the activity of the induction coil in the Laval nozzle, is formed from a nozzle material, whose specific electrical resistance is less than or equal to $10^{-6}$ ohm-meter or greater than or equal to $10^{-2}$ ohm-meter.

7. The device according to claim 1, further comprising:

a high-pressure chamber;

an atomisation chamber in fluid connection with the high-pressure chamber via the Laval nozzle;

first pressure control means for introducing the atomisation gas into the high-pressure chamber and for the control of a first gas pressure in the high-pressure chamber; and second pressure control means for the control of a second gas pressure in the atomisation chamber, wherein the first and the second pressure control means are configured to set the first and second gas pressures for accelerating the atomisation gas in a direction parallel to the flow direction of the melt flow, in a manner such that the first gas pressure divided by the second gas pressure is greater than 1.8 and the first gas pressure is greater than 10 bar.

8. The device according to claim 1, wherein at least one of the windings of the induction coil which is arranged in a region of the end of the material rod which faces the Laval nozzle and at least in sections runs perpendicularly to the rod axis, for producing an electromagnetic field which with respect to the rod axis of the material rod is symmetrical in the region.

9. The device according to claim 8, wherein at least one winding is a ring conductor which is electrically interrupted at a location.

10. The device according to claim 9, wherein at least two of the windings are ring conductors that are connected electrically in parallel.

11. The device according to claim 10, wherein ring conductors with a different periphery have at least one of different cross sections to one another and have different distances to one another along the coil axis, so that they each have an approximately equal electrical resistance and produce a homogeneous field distribution along the rod axis.

12. The device according to claim 1, wherein the induction coil at least in sections is wound in a spiral manner, and in a continuous manner with a pitch which is different to zero with respect to a direction parallel to the rod axis, wherein the windings in this section run on the envelope of a cone symmetrical to the rod axis.

13. The device according to claim 1, wherein a conductor forming the induction coil is a hollow tube for leading a cooling fluid.

14. The device according to claim 1, wherein at least one further nozzle which is arranged aligned to the Laval nozzle and which is arranged between the material rod and the Laval nozzle, so that the melt flow is led through the further nozzle, wherein the further nozzle is configured to accelerate a gas introduced with the melt flow into the further nozzle, in a direction parallel to the melt flow, to at least half the speed of sound of the gas introduced into the further nozzle.

* * * * *